United States Patent
Yokosawa

(10) Patent No.: US 6,816,368 B2
(45) Date of Patent: Nov. 9, 2004

(54) DISK ARRAY UNIT

(75) Inventor: Takanaga Yokosawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/350,768

(22) Filed: Jan. 24, 2003

(65) Prior Publication Data

US 2003/0112598 A1 Jun. 19, 2003

Related U.S. Application Data

(63) Continuation of application No. PCT/JP00/04942, filed on Jul. 25, 2000.

(51) Int. Cl.$^7$ .................................................. H05K 7/00
(52) U.S. Cl. ....................... 361/685; 361/740; 439/153; 174/35 R
(58) Field of Search ............................... 361/674–687, 361/724–727, 732, 740; 312/223.1–223.6; 439/60, 152–153; 174/35 R

(56) References Cited

U.S. PATENT DOCUMENTS

| | | | |
|---|---|---|---|
| 5,247,427 A | 9/1993 | Driscoll et al. | 361/685 |
| 5,412,534 A | 5/1995 | Cutts et al. | 361/695 |
| 5,974,490 A * | 10/1999 | Fujimura et al. | 710/302 |
| 6,498,723 B1 * | 12/2002 | Konshak et al. | 361/685 |
| 2003/0111242 A1 * | 6/2003 | Radu et al. | 174/35 R |

FOREIGN PATENT DOCUMENTS

| | | |
|---|---|---|
| JP | 3-214490 | 9/1991 |
| JP | 6-267262 | 9/1994 |
| JP | 7-111078 | 4/1995 |
| JP | 9-146711 | 6/1997 |
| JP | 10-200280 | 7/1998 |
| JP | 10-268979 | 10/1998 |

* cited by examiner

*Primary Examiner*—Hung Van Duong
(74) *Attorney, Agent, or Firm*—Greer, Burns & Crain, Ltd.

(57) ABSTRACT

A disk array unit includes a motherboard enclosed within an enclosure. A group of first hard disk drives are mounted on the front surface of the motherboard. The individual first hard disk drives are kept in a standing attitude with respect to the front surface of the motherboard. One or more second hard disk drives are also mounted on the back surface of the motherboard. The disk array unit allows not only the front surface but also the back surface of the motherboard to receive the hard disk drives, so that the hard disk drives can efficiently be incorporated within the limited space, as compared with a conventional disk array unit. It is possible to realize an increased recording capacity of the entire disk array unit without enlarging the motherboard or adding another motherboard.

11 Claims, 12 Drawing Sheets

DISK ARRAY UNIT

This is a continuation of International PCT Application No. PCT/JP00/04942 filed Jul. 25, 2000.

BACKGROUND OF THE INVENTION

1. Field of the Invention

The present invention relates to a disk array unit including a printed circuit board and a group of recording disk drives standing on the printed circuit board and arranged in parallel with one another on the front side of the printed circuit board.

2. Description of the Prior Art

In general, a disk array apparatus such as a RAID includes a disk array unit and a controller unit controlling the operation of the disk array unit. A plurality of recording disk drives such as hard disk drives (HDDs) are assembled in the disk array unit. The controller unit is designed to manage the operation of the disk array unit in accordance with the instructions from a host such as a server computer.

As disclosed in Japanese Patent Application Publication 9-146711, for example, the disk array unit includes hard disk drives mounted on the front side of a printed circuit board or a motherboard. The individual hard disk drives are coupled to corresponding connectors mounted on the surface of the motherboard. The motherboard is connected to the controller unit through an interface printed circuit board mounted on the backside of the motherboard. The individual hard disk drives are allowed to exchange data with the controller unit through the interface printed circuit board and the motherboard. The hard disk drives are designed to receive electric power from a power source unit likewise mounted on the backside of the motherboard.

The users are expecting an increased recording capacity of the disk array unit. However, the number of hard disk drives to be mounted on the motherboard necessarily depends on the size of the motherboard. In particular, the disk array apparatus of a so-called rack mount type should have the width standardized for racks. An increase in the width of the motherboard is restricted. The recording capacity of the disk array unit should be increased without enlarging the motherboard.

SUMMARY OF THE INVENTION

It is accordingly an object of the present invention to provide a disk array unit capable of efficiently arranging recording disk drives within a limited space.

According to a first aspect of the present invention, there is provided a disk array unit comprising: a printed circuit board; first connectors mounted on the front surface of the printed circuit board; at least a recording disk drive standing on the first connectors on the front surface of the printed circuit board; second connectors mounted on the back surface of the printed circuit board; and at least a recording disk drive standing on the second connectors on the back surface of the printed circuit board.

The disk array unit allows not only the front surface but also the back surface of the printed circuit board to receive the recording disk drives, so that the recording disk drives can efficiently be incorporated within the limited space, as compared with a conventional disk array unit. It is possible to realize an increased recording capacity of the entire disk array unit without enlarging the printed circuit board or adding another printed circuit board.

Preferably, the space between the adjacent second connectors is set larger than the space between the adjacent first connectors. The disk array unit of this type enables the space between the recording disk drives on the second connector to be set larger than the space between the recording disk drives on the first connector. A larger quantity of air can be introduced into spaces between the recording disk drives on the back surface of the printed circuit board as compared with those on the front surface. The recording disk drives on the back surface of the printed circuit board can sufficiently be prevented from suffering from an excessive increase in temperature even with the introduced air which has absorbed heat from the recording disk drives on the front surface.

A through hole may be defined in the printed circuit board. The through hole allows a fluent flow of air between a space along the front surface of the printed circuit board and a space along the back surface of the printed circuit board.

For example, the disk array unit may further comprise: an enclosure defining a front side space containing the recording disk drive standing on the front surface of the printed circuit board, said enclosure defining a backside space containing the recording disk drive standing on the back surface of the printed circuit board; and a ventilator mechanism moving air from the front side space to the backside space. The disk array unit of this type contributes to prevention of an excessive increase in the temperature of the individual recording disk drives in a relatively simple and cheap manner.

According to a second aspect of the present invention, there is provided a disk array unit comprising: a printed circuit board; first recording disks kept in a standing attitude on the front surface of the printed circuit board in parallel with one another, said first recording disk drives spaced by a first distance; and second recording disks kept in a standing attitude on the back surface of the printed circuit board in parallel with one another, said second recording disk drives spaced by a second distance different from the first distance.

The disk array unit allows not only the front surface but also the back surface of the printed circuit board to receive the recording disk drives in the same manner as described above. Accordingly, the recording disk drives can efficiently be incorporated within the limited space, as compared with a conventional disk array unit. It is possible to realize an increased recording capacity of the entire disk array unit without enlarging the printed circuit board or adding another printed circuit board. Moreover, a larger quantity of air can be introduced into spaces between the recording disk drives arranged at locations spaced by a larger distance. The recording disk drives spaced by the larger distance can sufficiently be prevented from suffering from an excessive increase in temperature even if the heated air is introduced in the space containing the recording disk drives.

The disk array unit of this type may further comprise: an enclosure defining a front side space containing the first recording disk drives on the front surface of the printed circuit board, said enclosure defining a backside space containing the second recording disk drives on the back surface of the printed circuit board; and a ventilator mechanism moving air from the front side space to the backside space. The disk array unit of this type contributes to prevention of an excessive increase in the temperature of the individual recording disk drives in a relatively simple and cheap manner.

In this case, the second distance is preferably set larger than the first distance. The disk array unit may allow the air to flow through the front side space to the backside space. The air which has absorbed heat from the first recording disk drives is introduced into the backside space. A larger quantity of the air can easily be introduced into spaces between the second recording disks spaced by the second distance larger than the first distance in the backside space. Accordingly, the second recording disk drives can be prevented from suffering from an excessive increase in temperature even if the heated air is introduced in the backside space.

Here, a through hole may be defined in the printed circuit board. The through hole allows a fluent flow of air between the front side space on the front surface of the printed circuit board and the backside space on the back surface of the printed circuit board.

The disk array unit of the first and second aspect may be incorporated within a rack, for example. In this case, the aforementioned enclosure of the disk array unit may be received on the rack. As conventionally known, the rack may also receive a controller unit managing the operation of the disk array unit, an electronic apparatus such as a host computer, a switching router, and the like, connected to the controller unit.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
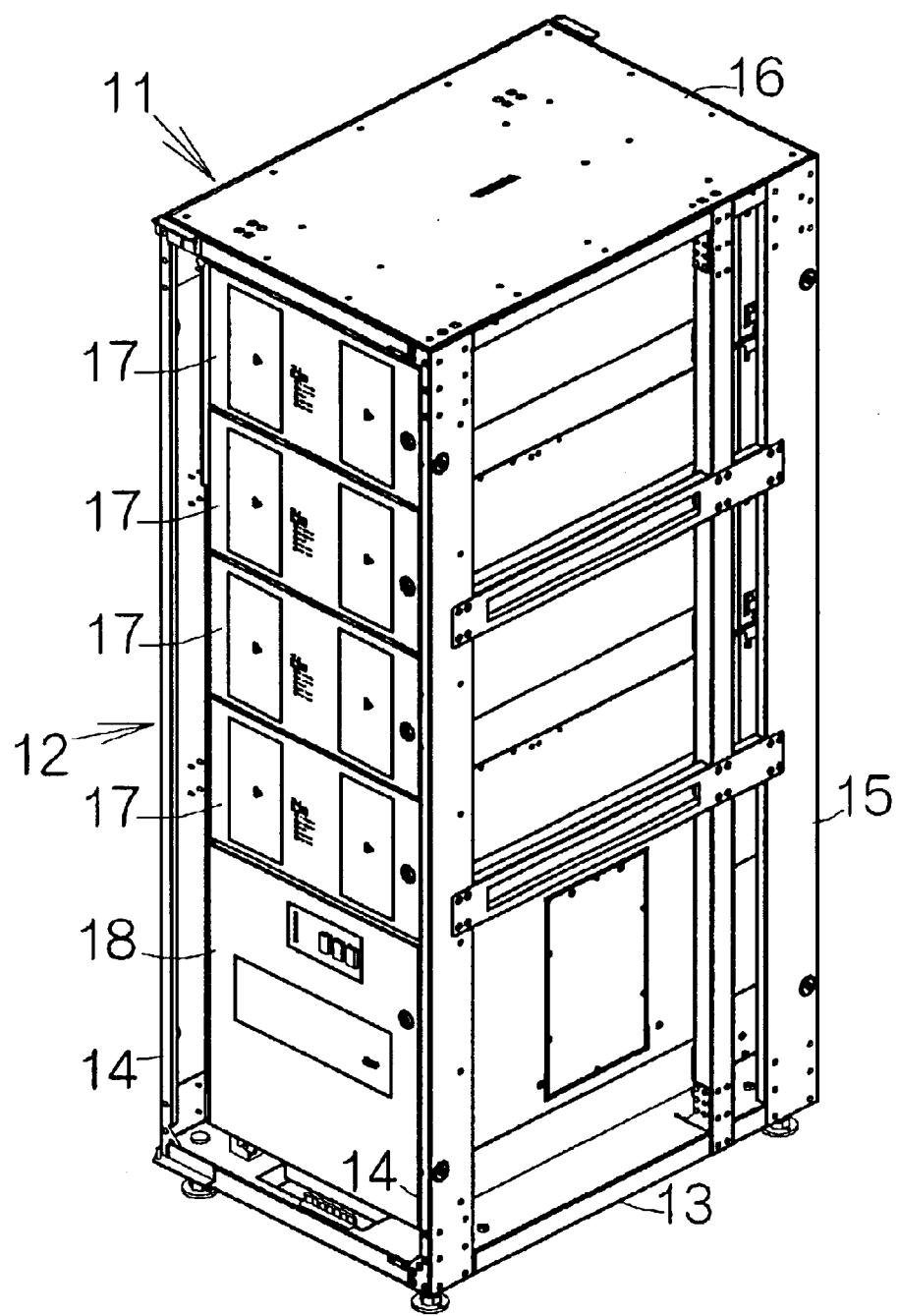
FIG. 1 is a perspective view schematically illustrating the entire structure of a disk array apparatus of a rack mount type.

As shown in FIG. 1, a disk array apparatus 11 as an electronic apparatus of a rack mount type includes a rack 12 standardized as a so-called 19 inches rack. The rack 12 includes a rectangular bottom plate 13 extending in a horizontal datum plane, for example. The front corners of the bottom plate 13 individually receive front columns 14 standing upright from the bottom plate 13. Likewise, the rear corners of the bottom plate 13 individually receive rear columns 15 standing upright from the bottom plate 13. A rectangular top plate 16 is coupled to the top ends of the front and rear columns 14, 15. The top plate 16 is designed to extend in parallel with the bottom plate 13. The rack 12 of this type is provided with a relatively high rigidity.

Disk array units 17, four of those in this case, are mounted in the rack 12. A controller unit 18 is likewise mounted in the rack 12 for managing the operation of the disk array units 17. The controller unit 18 is designed to manage the operation of the disk array units 17 based on the instructions supplied from a host, not shown, such as a server computer.

As conventionally known, the disk array units 17 and the controller unit 18 can be pulled out of the rack 12 forward in a horizontal direction through a space, standardized by 19 inches, between the adjacent front columns 14. To the contrary, when the disk array units 17 and the controller unit 18 is to be mounted on the rack 12, they are pushed rearward into the space between the front columns 14. In addition to the disk array units 17 and the controller unit 18, an electronic apparatus, such as a server computer, a switching router, and the like, having the 19 inches width may be mounted onto the rack 12.

Figure 2:
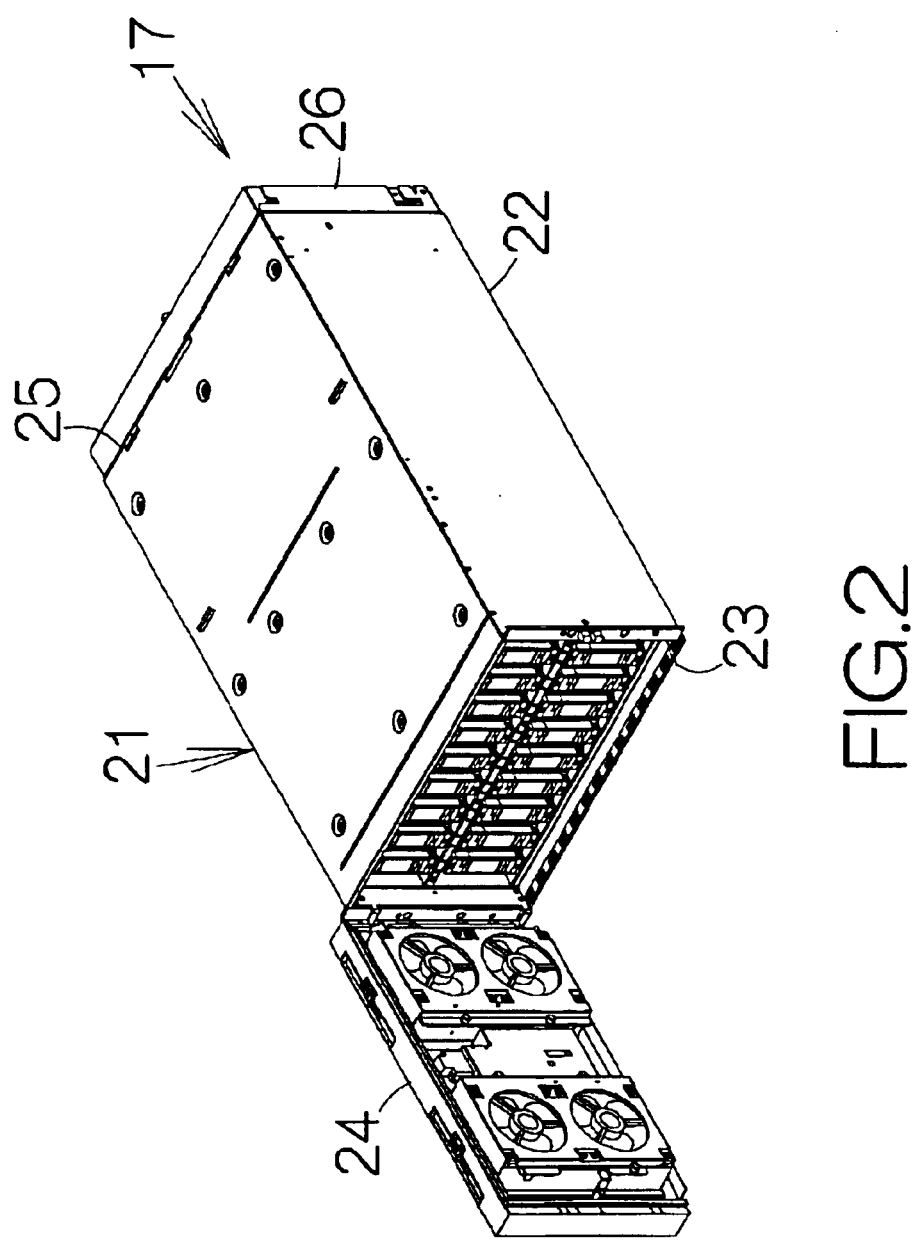
FIG. 2 is a perspective view schematically illustrating the entire structure of a disk array unit according to the present invention.

As shown in FIG. 2, the disk array unit 17 includes an enclosure 21 received on the rack 12. The enclosure 21 comprises a tube-shaped main body 22. The main body 22 may define a flat rectangular parallelepiped inner space. A front cover 24 is coupled to the main body 22 for opening and closing a front opening 23 of the main body 22. A hinge may be employed to couple the front cover 24 to the main body 22, for example. A rear cover 26 is coupled to the main body 22 for closing a rear opening 25 of the main body 22.

Figure 3:
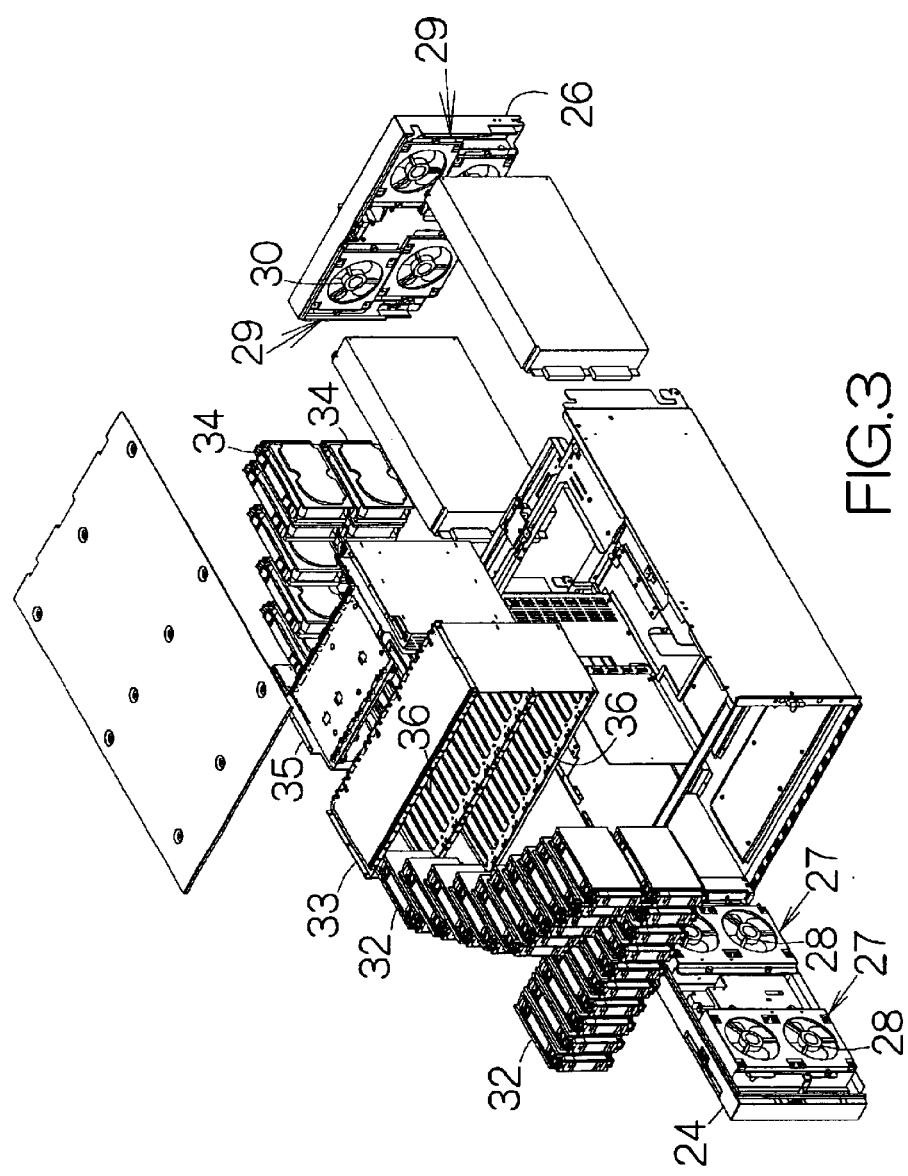
FIG. 3 is an exploded view of the disk array unit.

As is apparent from FIG. 3, an inflow unit 27 is incorporated within the front cover 24. The inflow unit 27 is designed to introduce the outside air into the space within the main body 22 through the front opening 23. The inflow unit 27 comprises blower fans 28 arranged in rows, for example. An outflow unit 29 is likewise incorporated within the rear cover 26. The outflow unit 29 is designed to discharge the air from the space within the main body 22 to the outside through the rear opening 25. The outflow unit 29 likewise comprises blower fans 30 arranged in rows, for example. The inflow and outflow units 27, 29 cooperate to generate flow of air from the front opening 23 to the rear opening 25. Specifically, the inflow and outflow units 27, 29 function as a ventilator mechanism according to the present invention. It should be noted that at least either of the inflow unit 27 or outflow unit 29 may be incorporated in the disk array unit 17.

As shown in FIG. 3, a front shelf 33 and a rear shelf 35 are incorporated within the enclosure 21. The front shelf 33 is designed to contain first hard disk drives 32 arranged in upper and lower rows. The rear shelf 35 is designed to contain second hard disk drives 34 likewise arranged in upper and lower rows. The hard disk drives 32, 34 may include hard disks of 3.5 inches, for example. As conventionally known, the thickness of the hard disk drives 32, 34 are set at 1.6 inches, for example. The first hard disk drives 32 as well as the second hard disk drives 34 are kept in a standing attitude. The hard disks within the hard disk drives 32, 34 of the standing attitude is allowed to rotate around rotational shafts extending in a horizontal direction. Upper and lower guide rails 36, 36 are attached to the individual shelves 33, 35. The upper and lower guide rails 36, 36 are designed to interpose the corresponding hard disk drive 32, 34 therebetween. The hard disk drive 32, 34 is thus allowed to slide in the back-and-forth direction along the upper and lower guide rails 36, 36. The back-and-forth movement of the hard disk drive 32, 34 serves to realize the insertion and removal of the hard disk drive 32, 34 into and from the front and rear shelves 33, 35. The first hard disk drives 32 may be inserted and removed through the front opening 23 when the front cover 24 has been opened. Likewise, the second hard disk drives 34 may be inserted and removed through the rear opening 25 when the rear cover 26 has been opened.

Figure 4:
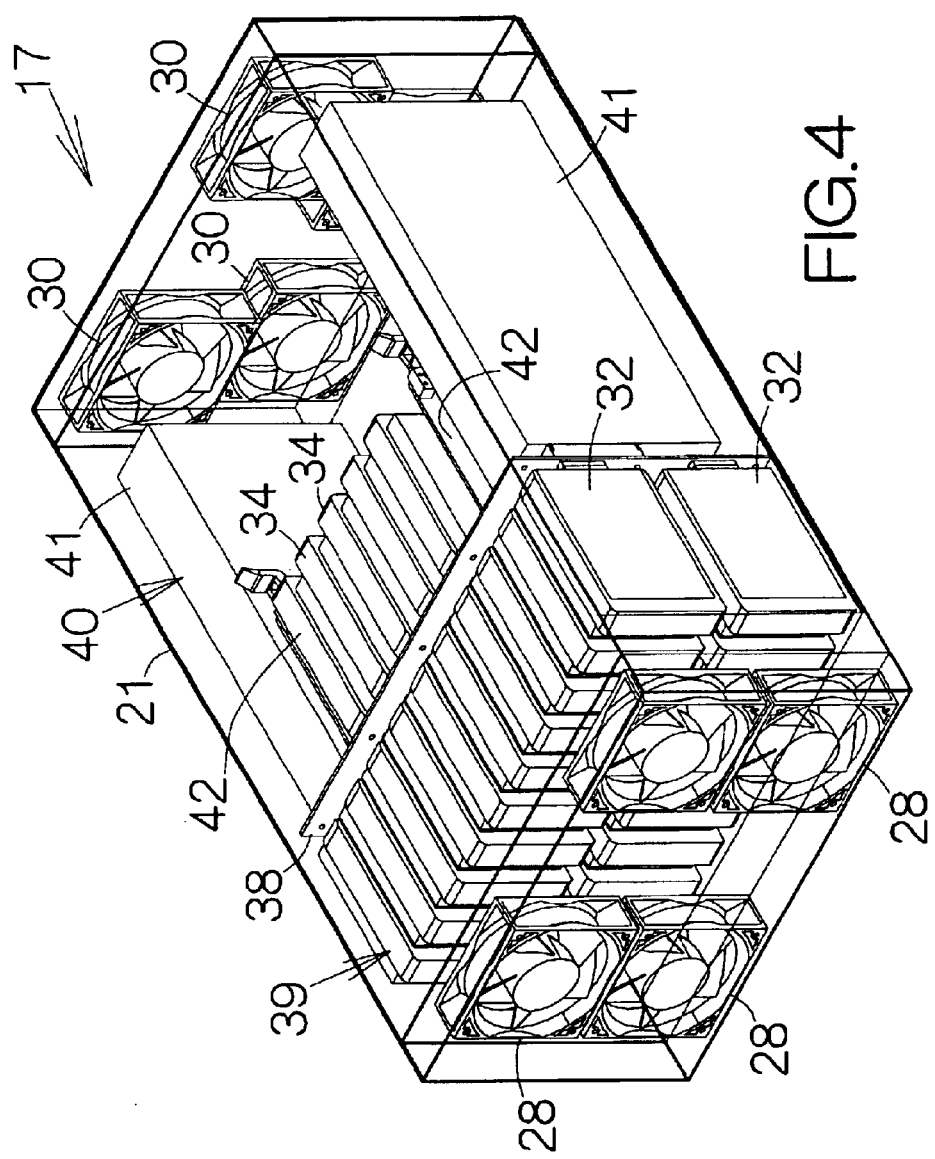
FIG. 4 is a perspective view of the disk array unit for schematically illustrating the interior structure of the disk array unit.

As is apparent from FIG. 4, a printed circuit board or motherboard 38 is interposed between the front and rear shelves 33, 35 within the enclosure 21. The motherboard 38 is allowed to extend in a vertical direction. The first hard disk drives 32 for the front shelf 33 are electrically connected to the front surface of the motherboard 38. The first hard disk drives 32 are kept in a standing attitude with respect to the front surface of the motherboard 38. The second hard disk drives 34 for the rear shelf 35 are electrically connected to the back surface of the motherboard 38 in the same manner. The second hard disk drives 34 are kept in a standing attitude with respect to the back surface of the motherboard 38. The motherboard 38 in this manner serves to divide a space within the enclosure 21 into front and rear sections. Specifically, the inner space of the enclosure 21 is divided into a front side space 39 containing the first hard disk drives 32 on the front side of the motherboard 38 and a backside space 40 containing the second hard disk drives 34 on the back side of the motherboard 38.

A pair of power source units 41 are mounted on the back surface of the motherboard 38. The power source units 41 are designed to supply electric power to the individual hard disk drives 32, 34. The hard disk drives 32, 34 are allowed to operate based on the supply of the electric power from the power source units 41. The individual power source units 41 may receive electric power from an outlet, not shown, through a wire, not shown.

A pair of interface printed circuit boards 42 are likewise mounted on the back surface of the motherboard 38. Data lines, not shown, from the controller unit 18 are connected to the individual interface printed circuit boards 42. The interface printed circuit boards 42 serve to establish data communication between the controller unit 18 and the individual hard disk drives 32, 34.

Figure 5:
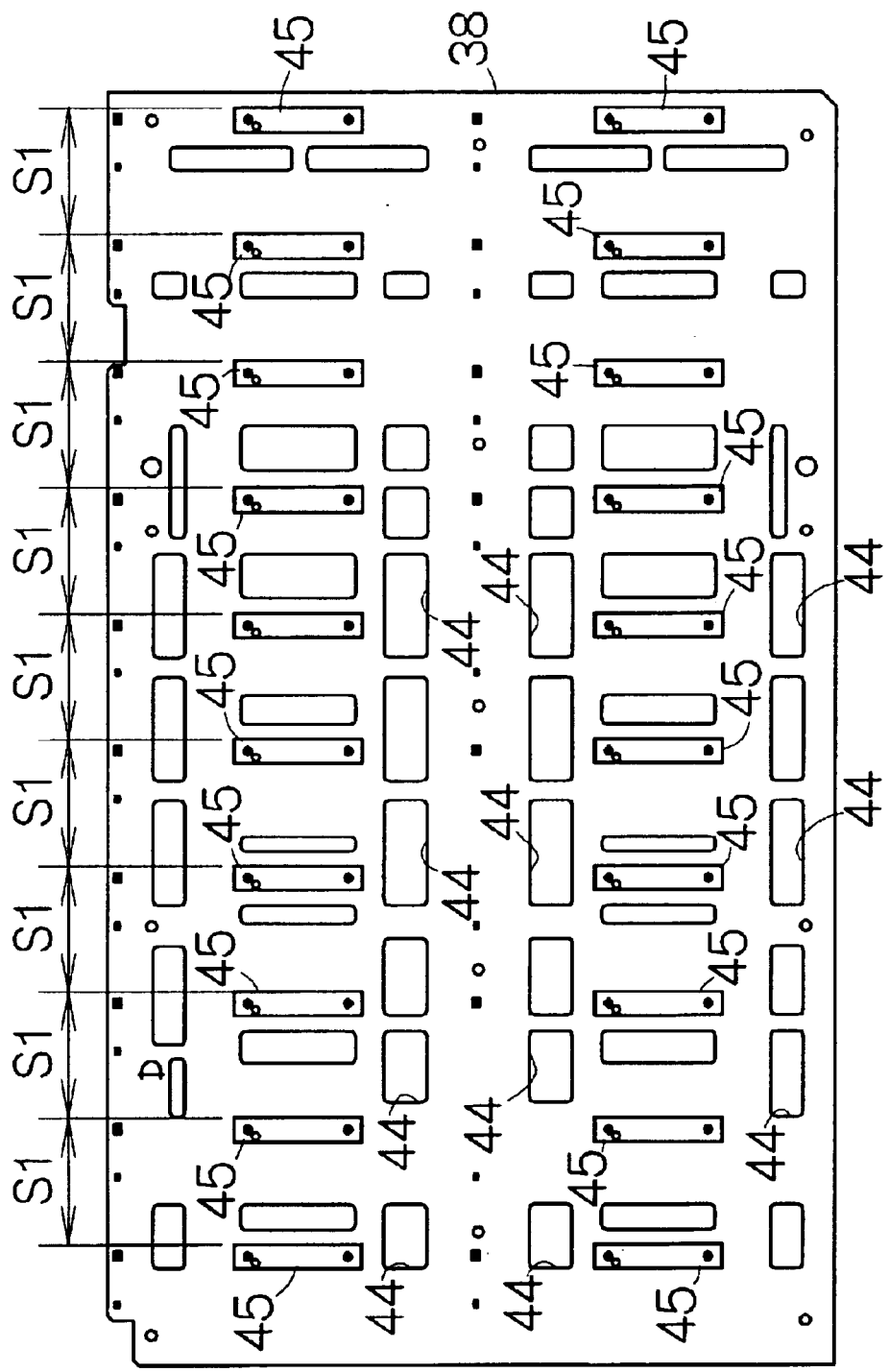
FIG. 5 is an enlarged plan view schematically illustrating the front surface of a motherboard.

FIG. 5 illustrates a plan view of the front surface of the motherboard 38. Through holes or openings 44 are defined in the motherboard 38. The openings 44 are expected to promote the aforementioned flow of air from the front opening 23 to the rear opening 25.

Front side connectors 45 in upper and lower horizontal rows are mounted on the front surface of the motherboard 38. Here, the front side connectors 45 are arranged in 10 lines by 2 rows, for example. A first distance S1 is kept between the adjacent front side connectors 45. When the front side connectors 45 receive the first hard disk drives 32, the first hard disk drives 32 are arranged at locations horizontally spaced by the first distances S1.

Figure 6:
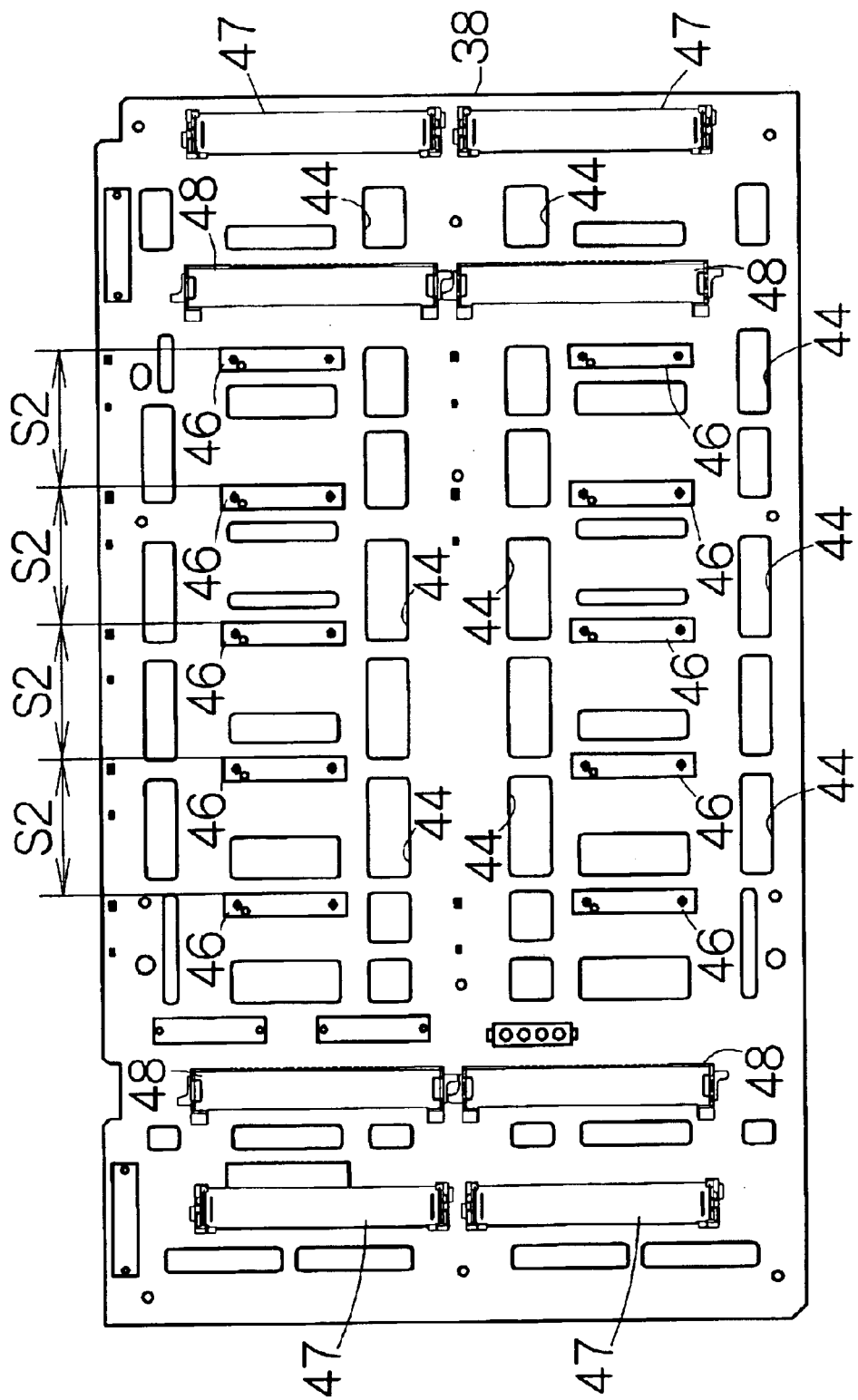
FIG. 6 is an enlarged plan view schematically illustrating the back surface of the motherboard.

As shown in FIG. 6, backside connectors 46 in upper and lower horizontal rows are mounted on the back surface of the motherboard 38. Here, the backside connectors 46 are arranged in 5 lines by 2 rows, for example. A second distance S2 larger than the first distance S1 is kept between the adjacent backside connectors 46. When the backside connectors 46 receive the second hard disk drives 34, the second hard disk drives 34 are arranged at locations horizontally spaced by the second distances S2. Otherwise, power source connectors 47 are also mounted on the back surface of the motherboard 38 for receiving the aforementioned power source units 41. Likewise, interface connectors 48 are also mounted on the back side of the motherboard 38 for receiving the aforementioned interface printed circuit boards 42.

Figure 7:
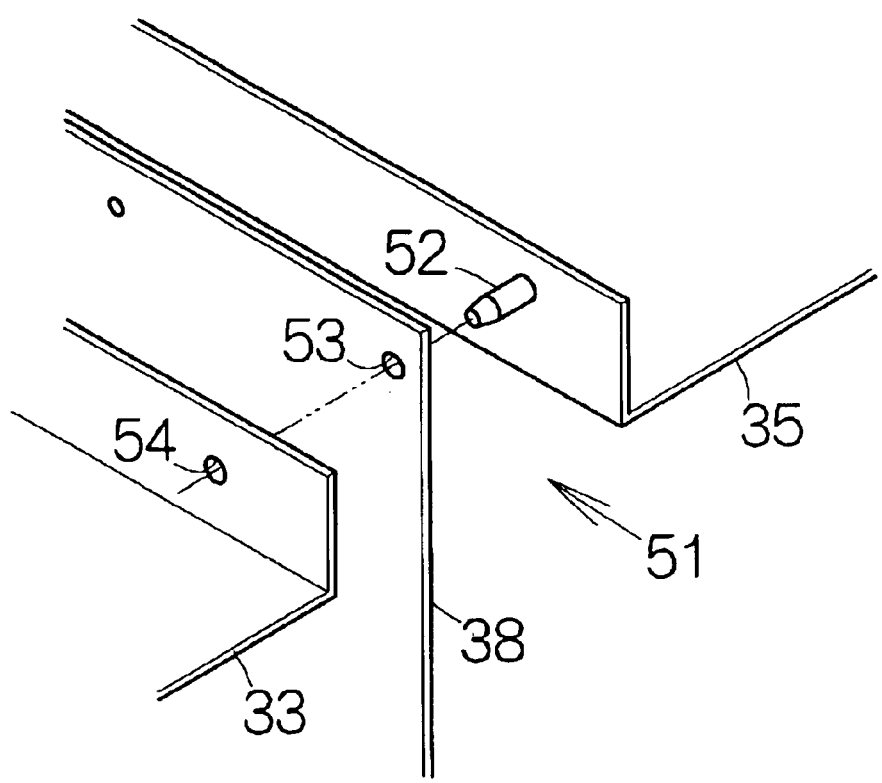
FIG. 7 is an enlarged partial perspective view schematically illustrating the structure of a positioning mechanism.

The individual first hard disk drives 32 can be positioned based on the aforementioned guide rails 36 fixed on the front shelf 33 at locations spaced by the first distances S1. Likewise, the individual second hard disk drives 34 can be positioned based on the aforementioned guide rails 36 fixed on the rear shelf 35 at locations spaced by the second distances S2. In this case, a positioning mechanism 51 may be provided common to the front and rear shelves 33, 35 and the motherboard 38, as shown in FIG. 7. The positioning mechanism 51 should be designed to establish the alignment between the front side connectors 45 and the guide rails 36 in the front shelf 33 as well as between the backside connectors 46 and the guide rails 36 in the rear shelf 35. The positioning mechanism 51 may comprise a protrusion 52 disposed on any one of the front and rear shelves 33, 35, for example. The protrusion 52 may be received in a through bore 53 defined in the motherboard 38 as well as in a through bore 54 defined in the other of the front and rear shelves 33, 35.

Since the disk array unit 17 allows not only the front surface but also the back surface of the motherboard 38 to receive the hard disk drives 32, 34, the hard disk drives 32, 34 can efficiently be incorporated within the limited space of the enclosure 21. It is possible to realize an increased recording capacity of the entire disk array unit 17 without enlarging the motherboard 38 or adding another motherboard 38. In addition, any additional power source unit 41 and/or additional interface printed circuit board 42 are not required to increase the number of the hard disk drives 32, 34.

Now, assume the disk array unit 17 operating. The operation of the hard disk drives 32, 34 causes activation of the inflow and outflow units 27, 29. The blower fans 28, 30 serve to generate the flow of air from the front opening 23 to the rear opening 25. The flowing air first passes through spaces between the first hard disk drives 32. The flowing air absorbs heat radiating from the first hard disk drives 32. The individual first hard disk drives 32 are thus reliably prevented from suffering from an excessive increase in temperature.

The heated air is then allowed to flow into the rear shelf 35. The flowing air passes through spaces between the second hard disk drives 34. The flowing air absorbs heat radiating from the second hard disk drives 34. Since the second hard disk drives 34 are arranged at locations spaced by the second distances S2 in the aforementioned manner, a sufficient quantity of the flowing air can be introduced into the spaces between the second hard disk drives 34. Even with the heated air, the individual second hard disk drives 34 are reliably prevented from suffering from an excessive increase in temperature.

Figure 8:
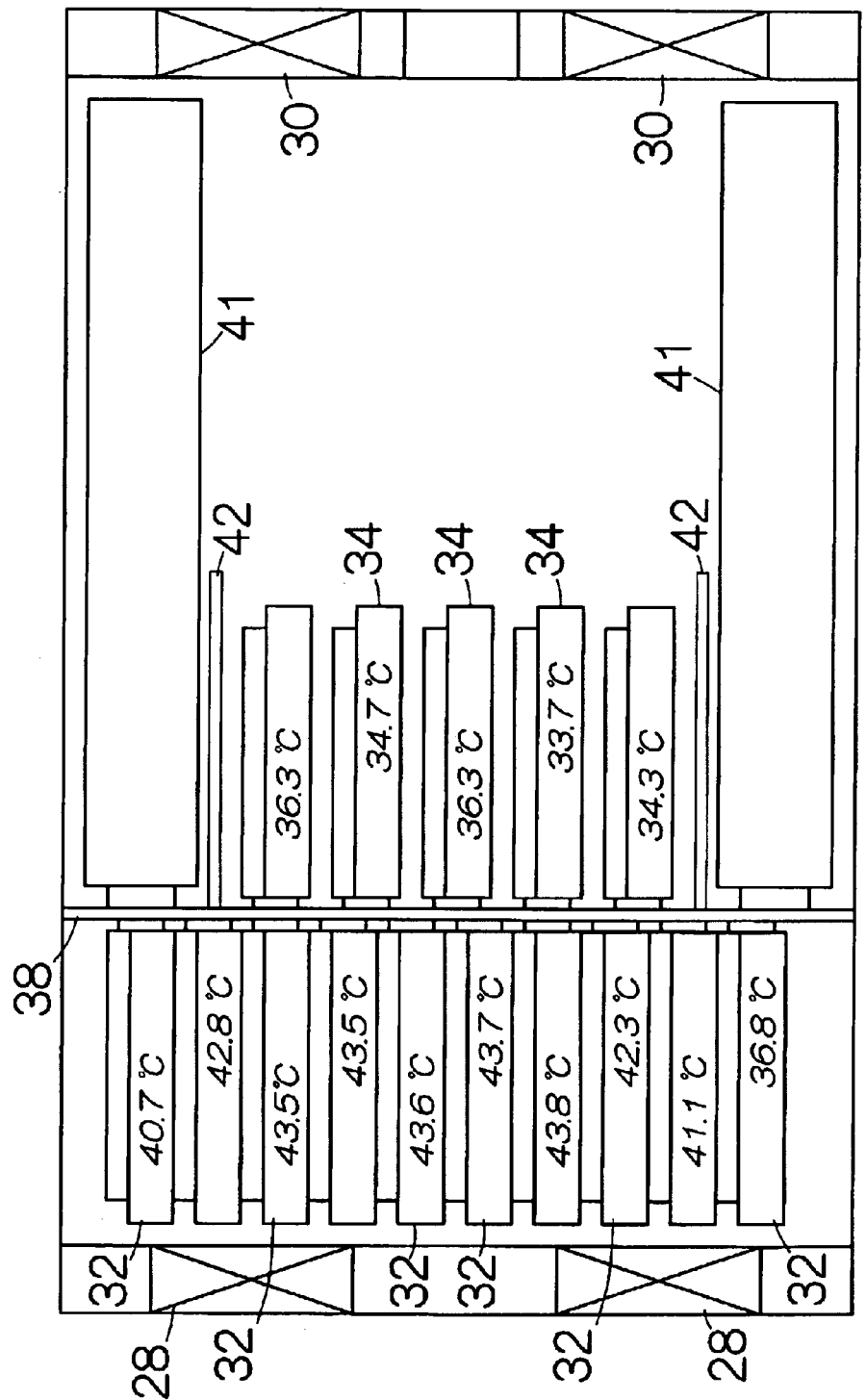
FIG. 8 is a schematic view illustrating the distribution of heat for first and second hard disk drives of an upper row within the disk array unit.
Figure 9:
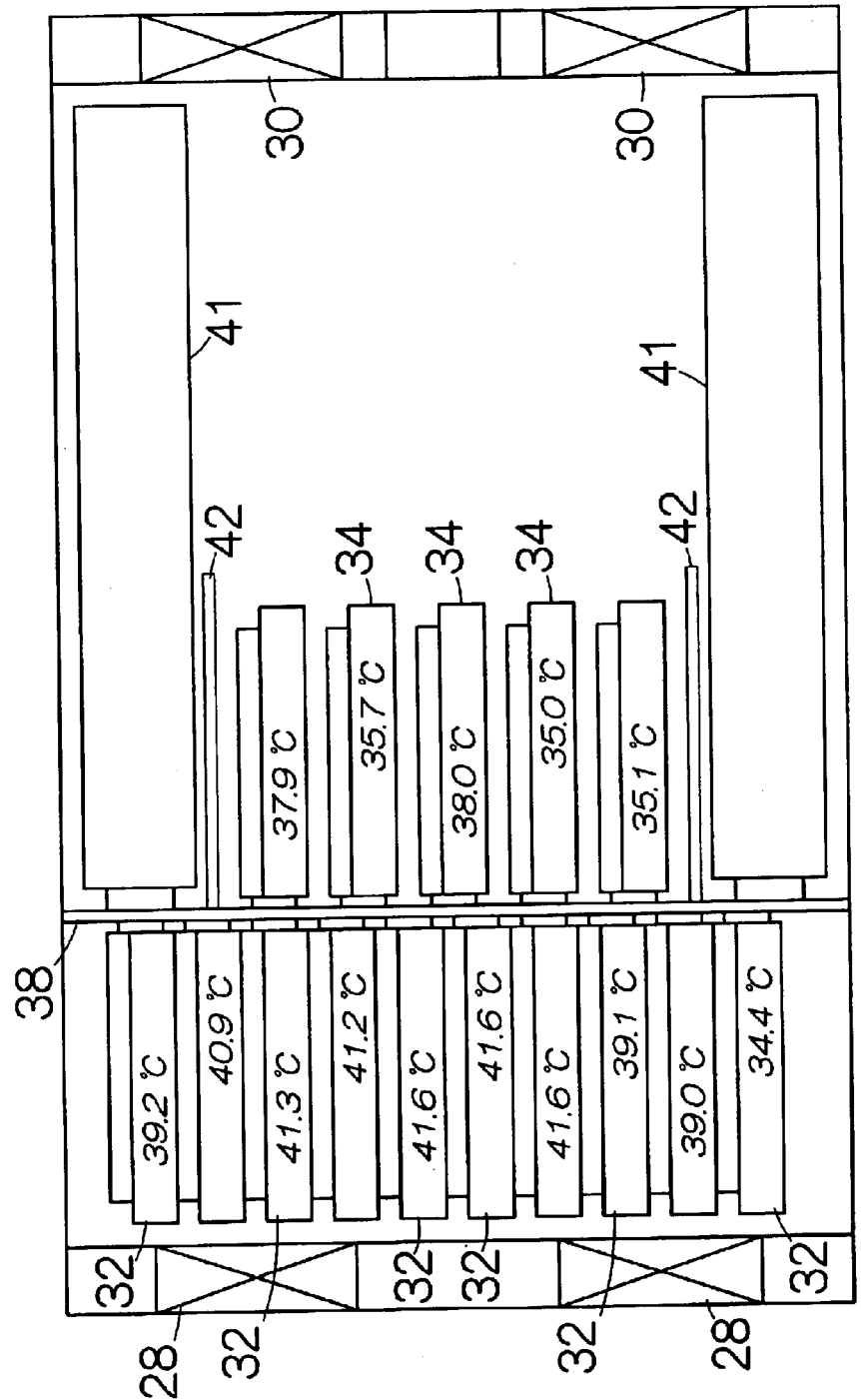
FIG. 9 is a schematic view illustrating the distribution of heat for first and second hard disk drives of a lower row within the disk array unit.
Figure 10:
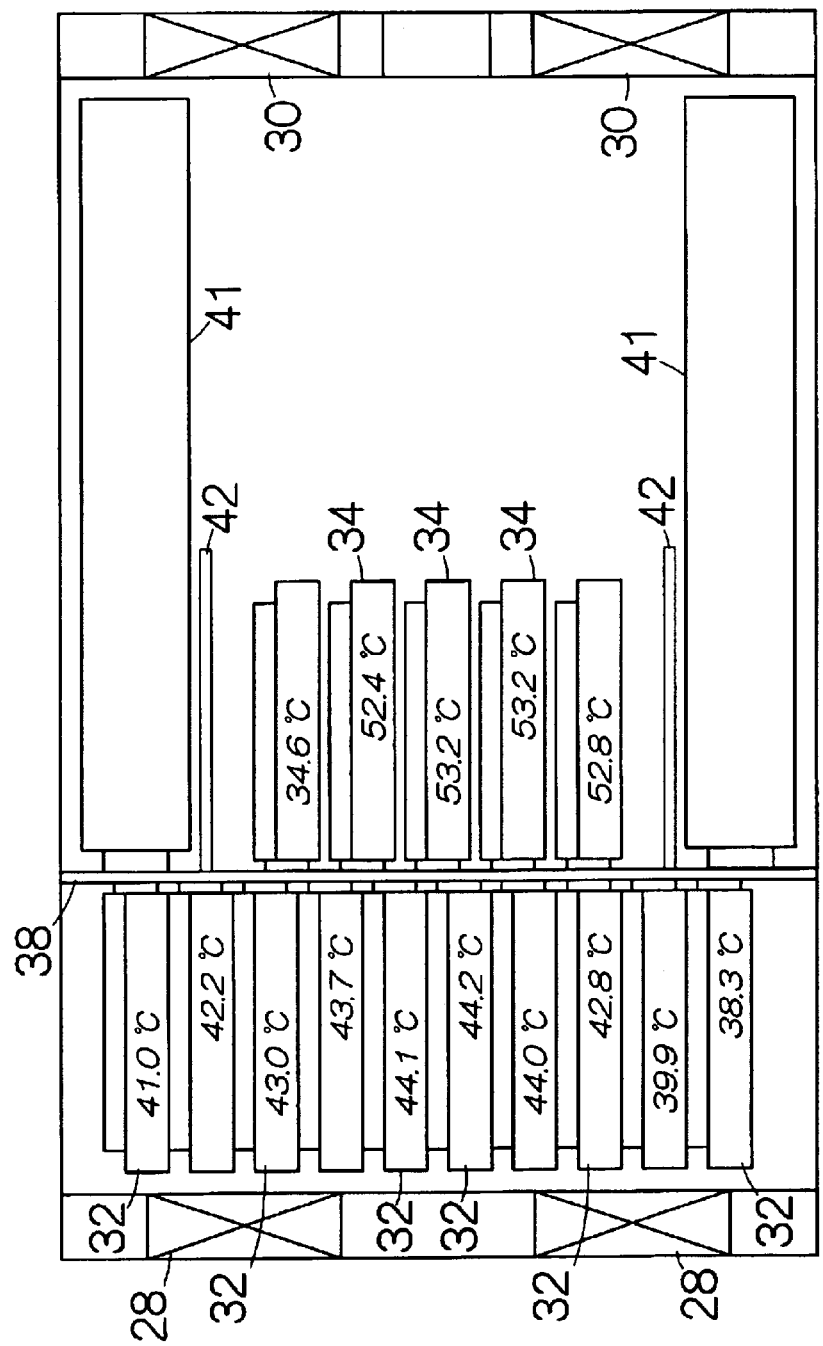
FIG. 10 is a schematic view illustrating the distribution of heat for first and second hard disk drives of an upper row within a disk array unit according to a comparative example.
Figure 11:
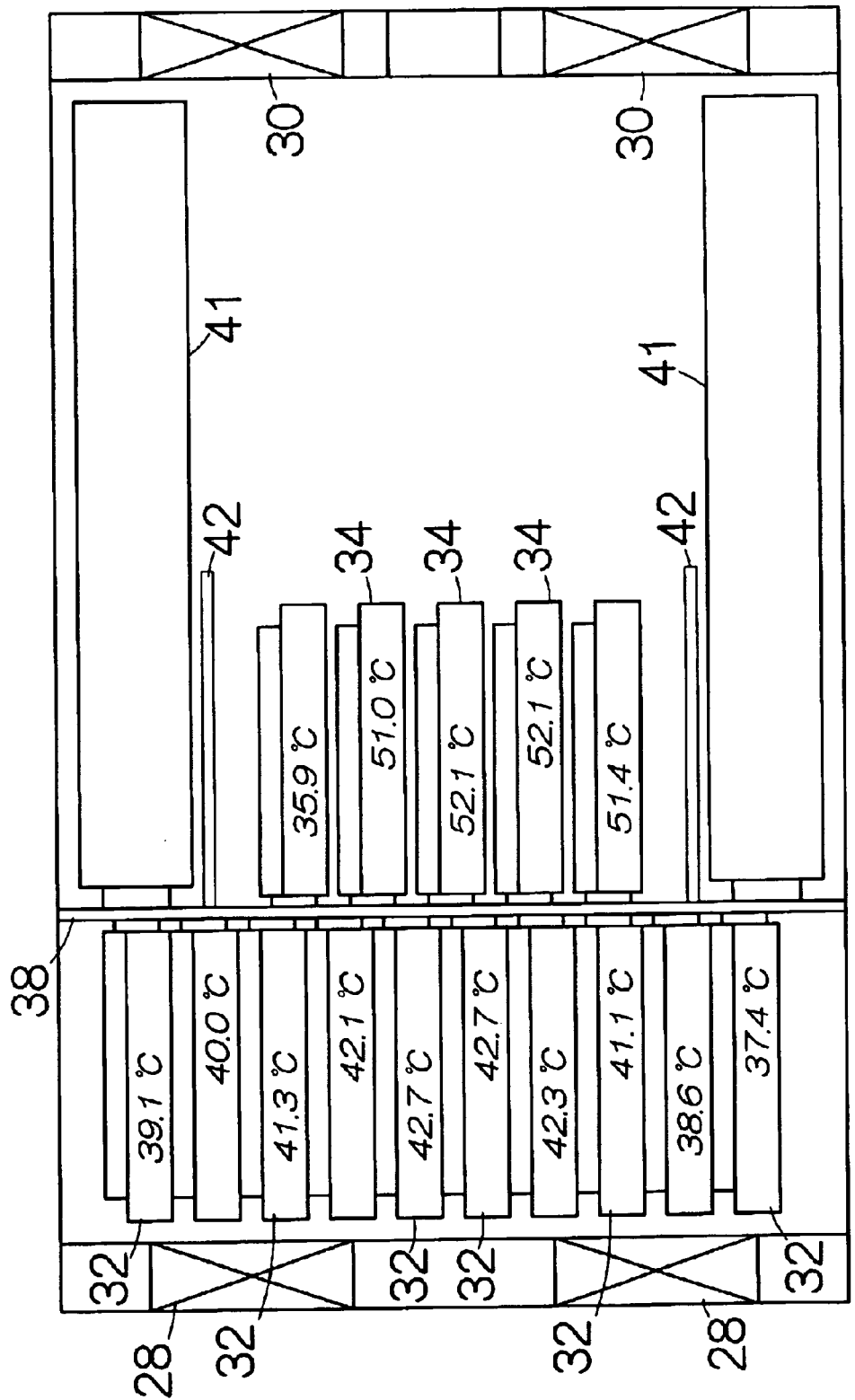
FIG. 11 is a schematic view illustrating the distribution of heat for first and second hard disk drives of a lower row within the disk array unit according to the comparative example.

The inventors have calculated the distribution of heat in the disk array unit 17 based on a computer simulation. As shown in FIG. 8, the temperature of the individual hard disk drives 32, 34 at the upper row was calculated. Likewise, the temperature of the individual hard disk drives 32, 34 at the lower row was calculated as shown in FIG. 9. The first distance S1 was set at 43.18 mm between the adjacent first hard disk drives 32. The second distance S2 was set at 48.36 mm between the adjacent second hard disk drives 34. The temperature of the atmosphere was set at 25 degrees Celsius. On the other hand, when the second distance S2 was set equal to the first distance S1 (=43.18 mm) between the adjacent second hard disk drives 34, the second hard disk drives 34 got heated as compared with the aforementioned situation, as shown in FIGS. 10 and 11.

Figure 12:
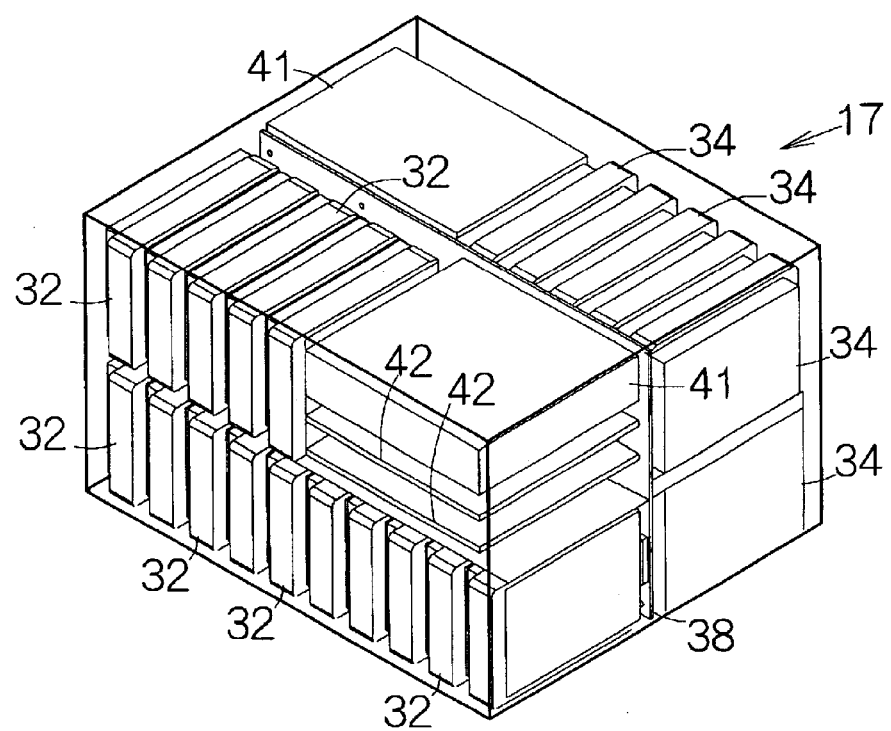
FIG. 12 is a perspective view schematically illustrating the entire structure of a disk array unit according to a modification of the aforementioned embodiment.

In general, two or more power source units 41 and interface printed circuit boards 42 are mounted on the single motherboard 38 in the disk array unit 17. The sets of the power source units 41 and the interface printed circuit boards 42 serve to reinforce the redundancy of the disk array unit 17. Even if one of the power source units 41 or interface printed circuit boards 42 breaks down, the disk array unit 17 keeps operating afterward. The power source units 41 and the interface printed circuit boards 42 may be mounted only on the back surface of the motherboard 38 as described above or on both front and back surfaces of the motherboard 38 as shown in FIG. 12.

What is claimed is:

1. A disk array unit comprising:
   a printed circuit board;
   first connectors mounted on a front surface of the printed circuit board;
   at least a recording disk drive standing on the first connectors on the front surface of the printed circuit board;
   second connectors mounted on a back surface of the printed circuit board; and
   at least a recording disk drive standing on the second connectors on the back surface of the printed circuit board.

2. The disk array unit according to claim 1, wherein a space between the adjacent second connectors is set larger than a space between the adjacent first connectors.

3. The disk array unit according to claim 2, a through hole is defined in the printed circuit board.

4. The disk array unit according to claim 3, further comprising:
   an enclosure defining a front side space containing the recording disk drive standing on the front surface of the printed circuit board, said enclosure defining a backside space containing the recording disk drive standing on the back surface of the printed circuit board; and
   a ventilator mechanism moving air from the front side space to the backside space.

5. The disk array unit according to claim 4, wherein said enclosure is received on a rack.

6. A disk array unit comprising:
   a printed circuit board;
   first recording disk drives kept in a standing attitude on a front surface of the printed circuit board in parallel with one another, said first recording disk drives spaced by a first distance; and
   second recording disk drives kept in a standing attitude on a back surface of the printed circuit board in parallel with one another, said second recording disk drives spaced by a second distance different from the first distance.

7. The disk array unit according to claim 6, wherein said second distance is set larger than the first distance.

8. The disk array unit according to claim 6, further comprising:
   an enclosure defining a front side space containing the first recording disk drives on the front surface of the printed circuit board, said enclosure defining a backside space containing the second recording disk drives on the back surface of the printed circuit board; and
   a ventilator mechanism moving air from the front side space to the backside space.

9. The disk array unit according to claim 8, wherein a through hole is defined in the printed circuit board.

10. The disk array unit according to claim 9, wherein said second distance is set larger than the first distance.

11. The disk array unit according to claim 10, wherein said enclosure is received on a rack.

* * * * *